(12) United States Patent
Dixon

(10) Patent No.: US 6,235,396 B1
(45) Date of Patent: May 22, 2001

(54) OPTICAL LENS COMPRISING A POLYVINYLALCOHOL LAYER COVALENTLY BONDED TO A BULK LENS POLYMER

(76) Inventor: Arthur R. Dixon, 8117 Manchester #721, Playa Del Rey, CA (US) 90293

( * ) Notice: Subject to any disclaimer, the term of this patent is extended or adjusted under 35 U.S.C. 154(b) by 0 days.

(21) Appl. No.: 09/106,039

(22) Filed: Jun. 26, 1998

(51) Int. Cl.[7] .............. B32B 7/04; B32B 27/36; B32B 27/00; C09J 4/00
(52) U.S. Cl. .............. 428/412; 428/420; 428/424.2; 428/424.4; 428/520; 156/331.7
(58) Field of Search .............. 428/412, 420, 428/424.2, 424.4, 515, 520; 156/331.4, 331.7

(56) References Cited

U.S. PATENT DOCUMENTS

| | | | |
|---|---|---|---|
| 2,438,953 | 4/1948 | Thuline et al. | 260/27 |
| 2,596,863 | 5/1952 | Moulton et al. | 260/27 |
| 3,401,135 | 9/1968 | Sato | 39/41.895 |
| 3,467,617 | 9/1969 | Weichselbaum et al. | 260/33.6 |
| 3,489,712 | 1/1970 | Leveskis | 260/33.6 |
| 3,862,074 | 1/1975 | Hickey | 260/29.6 N |
| 3,959,210 | 5/1976 | Lipatova et al. | 260/42.13 |
| 4,110,184 | 8/1978 | Dart et al. | 204/159.23 |
| 4,201,828 | 5/1980 | Triebel et al. | 428/332 |
| 4,230,768 | 10/1980 | Hamada et al. | 428/352 |
| 4,299,942 | 11/1981 | Piestert et al. | 526/323.1 |
| 4,308,119 | 12/1981 | Russell | 204/159.12 |
| 4,554,185 | 11/1985 | Lane et al. | 427/385.5 |
| 4,608,400 | 8/1986 | Yokoshima et al. | 522/96 |
| 4,729,914 * | 3/1988 | Kliment et al. | 428/36 |
| 4,745,029 | 5/1988 | Kambour | 428/412 |
| 4,749,761 | 6/1988 | Howes | 526/264 |
| 4,804,613 * | 2/1989 | Matsuda et al. | 430/270 |
| 4,853,262 | 8/1989 | Horie et al. | 428/13 |
| 4,877,308 * | 10/1989 | Okuno et al. | 350/276 R |
| 5,007,975 | 4/1991 | Yamamoto et al. | 156/154 |
| 5,017,433 | 5/1991 | Chevreux et al. | 428/425.6 |
| 5,136,682 * | 8/1992 | Moyer et al. | 385/141 |
| 5,173,552 | 12/1992 | Renzi et al. | 526/230.5 |
| 5,371,133 | 12/1994 | Stanley | 524/457 |
| 5,380,387 | 1/1995 | Salamon et al. | 156/154 |
| 5,449,559 | 9/1995 | Furlan et al. | 428/424.6 |
| 5,614,586 | 3/1997 | Tang et al. | 524/817 |
| 5,667,735 | 9/1997 | Bae et al. | 264/1.7 |
| 5,820,594 * | 10/1998 | Fontirroche et al. | 604/96 |

* cited by examiner

Primary Examiner—D. S. Nakarani
Assistant Examiner—Kevin R. Kruer
(74) Attorney, Agent, or Firm—Lyon & Lyon LLP

(57) ABSTRACT

An optical lens comprising a polyvinylalcohol film layer that is covalently bonded to a bulk polymerizable material during formation of the polymeric lens. The bulk optical lens polymer is preferably a glycol bis(allylcarbonate). Covalent bonding between these materials is achieved via an adhesive mixture that contains (a) a polyurethane to bond with the polyvinylalcohol layer, and (b) a polymethacrylate terpolymer with (i) pendant hydroxy groups that bind to the urethane, and (ii) pendant allyl groups that covalently bond to the bulk polymer. This strong covalent bonding reduces the chance of delamination of the lens during surfacing, polishing, and edging, and preserves its integrity during the lifetime of the finished eyewear.

8 Claims, 1 Drawing Sheet

OPTICAL LENS COMPRISING A POLYVINYLALCOHOL LAYER COVALENTLY BONDED TO A BULK LENS POLYMER

FIELD OF THE INVENTION

This invention pertains to methacrylate polymers useful as adhesives, and in particular to the covalent joining of a polymeric film to bulk polymerizable material during formation of an optical polymeric lens.

BACKGROUND OF THE INVENTION

Most ophthalmic lenses dispensed today are made from plastic materials, such as diethylene glycol bis (allylcarbonate), a common form thereof being sold under the trademark "CR-39" by PPG, or other allylbased optical polymers. Plastic lenses are inexpensive to fabricate yet possess good optical properties and are lighter in weight than glass lenses. In the manufacture of plastic lenses it is often desirable to incorporate optically useful components, such as polarizing films, or films containing various dyes for different purposes, for example, to provide photochromic properties. Such films are well-known in the art and are generally formed as thermoplastic polymers, an example of which is a polymer film formed from polyvinyl alcohol. Typically, these films are either laminated between two formed lens blanks using an adhesive such as polyurethane or optical-grade epoxy, or a film previously coated with polyurethane is sandwiched within a mold filled with monomer that is then reacted to encapsulate the film and form a complete lens blank. The result is the formation of either a laminated or cast lens blank, manufactured with different diopters, and then shipped to optometrists and/or optometric laboratories where the lenses are ground to prescription and fit to various eye glass frames.

A significant problem that arises with the formation of such laminated lens blanks is a propensity for such blanks to shear when subjected to shock or when ground improperly. Shearing occurs along the interface of the polymer film and the main polymeric substrate; in effect, if the polymer film is only weakly bonded to the blanks, it acts somewhat as a release agent for the laminated substrate components when under stress. Similarly, this interface can be a weak spot even in cast blanks.

Another problem found with current adhesives is their limited shelf life before becoming unusable, as short as 48 hours. Additionally, current adhesives tend to seep, decreasing mold life. Moreover, in existing laminated lenses, the polymer film tends to yellow, presenting varying color lens to lens, or over time.

SUMMARY OF THE INVENTION

The present invention addresses the foregoing problems and provides an improved method for integrating the film and substrate so that under normal use as well as when improper grinding procedures are used, or the lens is subject to shock, the lens does not separate into components but remains an integral whole. The adhesive formulations of the current invention have long shelf life, several months to a year, or more if stored in nitrogen, with no significant discoloration. The invention is achieved by covalently joining the film to the optical substrate with an adhesive composition that takes advantage of the fact that the film and substrate contain reactive groups. The optical substrate contains allyl groups whereas the film laminated between opposing substrate surfaces also contains a reactive group, such as an hydroxy group. The adhesive composition is formed from a plurality of methacrylate polymers so that the resultant polymethacrylate has at least two associated groups that are covalently reactive with corresponding groups respectively on the film and optical substrate. Preferably the optical substrate is formed from the polymerization of a glycol bis(allylcarbonate), the polymeric film is a polyvinyl alcohol film, and the adhesive composition comprises (a) a polymethacrylate terpolymer formed to have pendant allyl and hydroxy groups and (b) an uncured polyurethane. The pendant allyl group is covalently reacted with the olefinic components of the optical polymer. Preferably, when the lens is cast, the polymeric film is positioned within the molding frame and optical lens monomer is added on opposite sides of it, to solidify material around the film. The pendant hydroxy group is covalently reacted with the uncured polyurethane, and the uncured polyurethane is covalently reacted with the polyvinyl alcohol film, thereby forming a covalently integrated laminate.

In addition to the previously mentioned advantages, this invention's covalent bonding means a much thinner adhesive layer (which is on the order of several nanometers, rather than micrometers, thick) can provide improved adhesion.

DETAILED DESCRIPTION OF THE INVENTION

Figure 1:
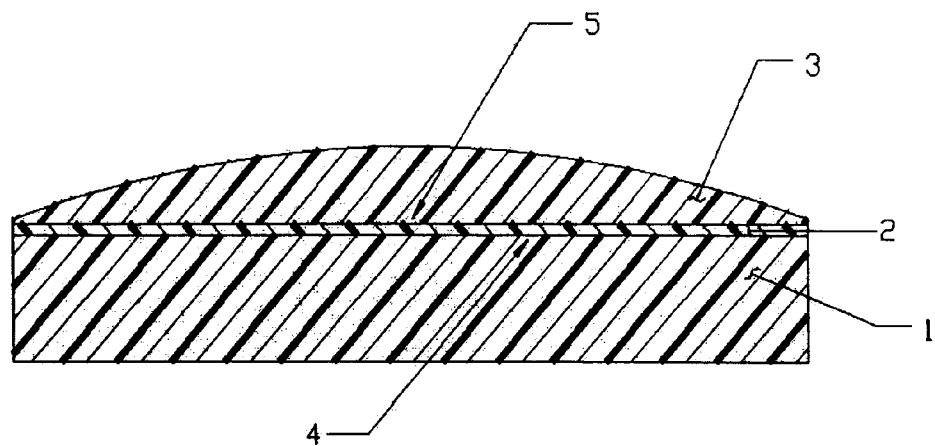
FIG. 1 is a schematic cross sectional view of a laminated lens produced in accordance with the present invention.

Referring to FIG. 1, there is shown a lens blank laminate including a lower lens substrate 1, about 10 mm thick, a polymer film 2, about 40 microns thick, and an upper lens substrate 3, about 0.1–5 mm thick. The lower substrate 1 is joined to the film 2 by means of an adhesive layer 4 while the upper substrate 3 is joined to the opposite surface of the film 2 by means of an adhesive layer 5. Such a structure is well-known to the art except for the nature of the adhesive material 4 and 5. In accordance with the present invention, the adhesive material is covalently reactive respectively with the film 2 and optical substrates 1 and 3. By means of covalent reaction, the resultant lens laminate is an integral whole.

Figure 2:
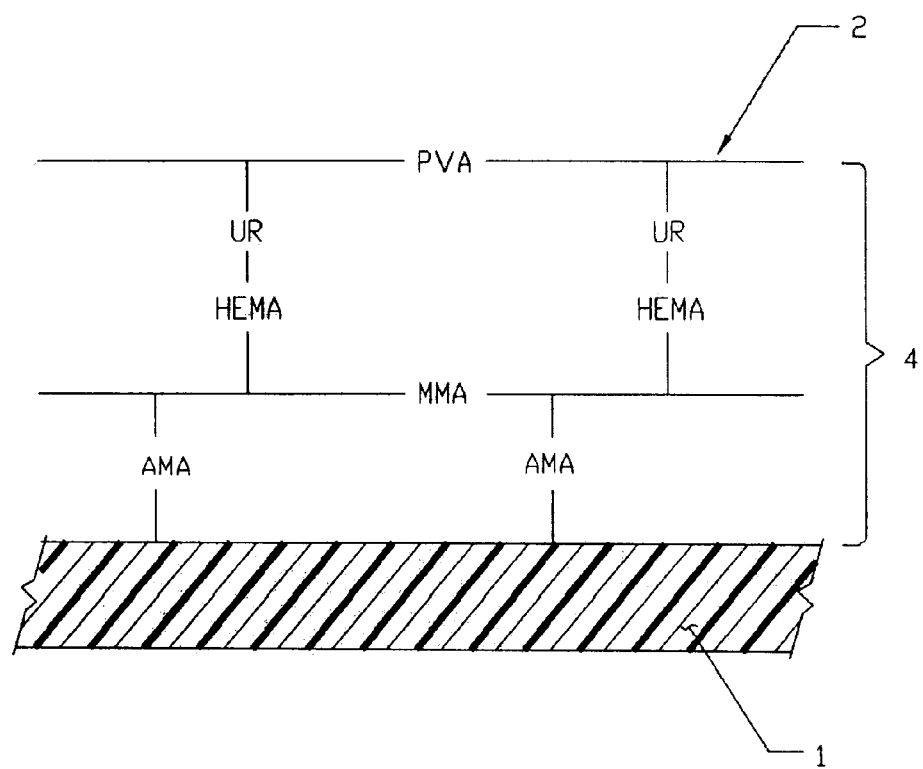
FIG. 2 is a schematic depiction of a covalently reacted integrated laminate of optical polymer, polymethacrylate terpolymer, and polyvinyl alcohol film, in accordance with this invention.

Referring to FIG. 2, covalent interconnectivity of the components is schematically illustrated. The lower lens substrate 1 is shown connected via a plurality of covalent reactions with a polyvinyl alcohol (PVA) film 2, mediated by a covalently reactive adhesive composition 4. The optical substrate 1 is in this case an optical polymer formed from the polymerization of a glycol bis(allylcarbonate), for example, diethylene glycol bis(allylcarbonate) or other allyl-based monomer. The film 2 is a polyvinyl alcohol film. The adhesive composition 4 comprises a polymethacrylate terpolymer formed, in this case, by the copolymerization of methyl methacrylate (MMA), allyl methacrylate (AMA) and 2-hydroxyethyl methacrylate (HEMA), and then admixed with uncured polyurethane (UR). Details of the preparation are given below. The adhesive material 4 is covalently reactive having allyl and hydroxy groups pendant from a polymethacrylate backbone. The allyl group, provided by the allyl methacrylate component, covalently reacts with olefinic components of the glycol bis(allylcarbonate) optical monomer while the hydroxy group, provided by the 2-hydroxyethyl methacrylate component, covalently reacts with the uncured polyurethane which, in turn, covalently reacts with the hydroxy group of the polyvinyl alcohol film 2. The result, when this mixture is cast by lens-forming techniques, is a covalent integration of the polyvinyl alcohol film, methacrylate terpolymer adhesive and diethylene glycol bis(allylcarbonate) optical substrate.

As indicated, the optical substrate is preferably a glycol bis(allylcarbonate), but other optical polymers can be used as a substrate, provided they have sufficient allyl or free radical reactivity. Other suitable polymers include diallyl phthalates, methacrylates, styrenes, and styrene acrylonitrile materials. Typically such polymers are hard, abrasion-resistant, transmit light in the visible spectrum, and block or absorb light in the ultraviolet range.

The polymer film is a polyvinyl alcohol film. Such films are easy to imbibe or dye, can be shaped and molded, or stretched for optical effects such as polarization. These films are commonly used for color filters, optical polarizers in ophthalmic lenses, liquid crystal displays, other optical displays, and display elements.

The covalently reactive methacrylate composition can include other hydroxylakyl methacrylates, e.g., having from 1 to 10 carbon atoms in the alkyl group, or one can polymerize with e.g., butyl-or octyl-methacrylate in place of the methyl methacrylate. Alternatively, one can provide the above functionality without using methyl methacrylate with a copolymer formed from only an allyl methacrylate and an hydroxyalkyl methacrylate.

Thus, one can have 0–96 mole percent methyl methacrylate, 2–50 mole percent allyl methacrylate and 2–50 mole percent hydroxyalkyl methacrylate. It is preferred to have at least 5 to 50% of each of allyl methacrylate and hydroxyalkyl methacrylate. A specific, preferred formulation is obtained by copolymerizing 75 mole percent methyl methacrylate, 15 mole percent allyl methacrylate and 10 mole percent 2-hydroxyethyl methacrylate. Polymerization is aided by a polymer initiator, such as azodiisobutyronitrile (AIBN).

The adhesive described by this invention may also contain other reactive groups for bonding to polymer films and monomeric reaction mixtures. In place of a polymethacrylate backbone, one can use polymers having other reactive pendant groups. For example, instead of alcohol groups, an amine group could be used. Similarly, groups that react directly with polyvinyl alcohol films, such as anhydrides, acid chlorides or isocyanate groups could be included. Additionally, the adhesive material may contain side chains that are not direct participants in covalent bonding between the polyvinyl alcohol film and the reactive monomeric mixture, but that change the physical or chemical properties of the material and resultant optical blank. These include side chains containing stable functional groups that act as , e.g., dyes, ultraviolet blocking agents, or modifiers of surface tension.

The uncured urethane component acts to covalently bridge the terpolymer and the polymer film. The amount of uncured polyurethane component is dependent on the amount of hydroxyalkyl methacrylate component. Suitable polyurethanes are formed from aliphatic urethanes which have low volatility, good solubility in the coating solvent, and good color stability. In addition, the mixture may include cured polyurethane to give strength within the coating by covalently bonding to the uncured polyurethane via allophonate or biuret coupling. These couplings are described in *Polymer Chemistry, an Introduction*, by Malcom P. Stevens, 1990, page 441–442.

In addition to the foregoing components, one can add a plasticizer to maintain fluidity. For example, one can advantageously use the monomer of the final substrate such as diethylene glycol bis(allylcarbonate), a dialkyl phthalate such as dibutyl phthalate, or other common plasticizers. The mixture of polymethacrylate, uncured polyurethane, cured polyurethane and plasticizer are added together in a suitable solvent such as methyl ethyl ketone. Other suitable solvents include ketones, esters and ethers that do not react with urethanes.

The covalently reactive adhesive can be applied either to the film or to the optical substrate. It is most effective when applied to the film prior to optical lens casting. Conveniently, it is applied to the film by dipping the film into a solution of the adhesive and withdrawing it at such a rate as to provide the desired thickness of adhesive on the film. A solvent suitable for coating a polyvinyl alcohol film can be determined by dipping the film in a candidate solvent and slowly removing it. An unacceptable solvent will not maintain a smooth coat on the film, but will pool up into droplets. Other methods of application such as spraying, spinning, rolling, casting, blading, extruding or vaporizing can be used. Whereas, prior methods of applying adhesive to make laminates typically use a coating of about 10 microns, in practice of the present invention, it is preferred to have a coating thickness in the range of 0.005 micron to 5 microns. This is exemplified in a particular embodiment by withdrawing the film from the adhesive solution at rate sufficient to apply about 0.3 microns on each side of the film. In this particular example, the film is cured in an oven at 70° C. for about 12 hours in the presence of a beaker of water to provide some moisture.

The following examples will illustrate the preparation of covalently reactive adhesive material.

EXAMPLE 1

A polymethacrylate adhesion promoter solution is produced from approximately 75 mole percent methyl methacrylate, 15 mole percent allyl methacrylate and 10 mole percent 2-hydroxyethyl methacrylate. A silicone oil bath was set for a constant temperature of 90–95° C. In to a 5 liter round bottom reaction flask, there was placed 2.00 kg of methyl ethyl ketone solvent, 280 grams of methyl methacrylate, 71 grams of allyl methacrylate and 48 grams of 2-hydroxyethyl methacrylate. Several boiling chips were placed in the reaction flask which was equipped with a reflux condenser on one of the two side 24/40 joints and the reaction flask was emersed in the oil bath until the two levels were equal. Stirring was started at a rate of about one and one-half revolutions per second.

Once a light reflux began, the oil level was lowered to allow the reaction to cool slightly and 4.05 grams of AIBN polymer initiator, dissolved in 40 ml methyl ethyl ketone, were added to the flask. The condenser was reconnected and a cap placed on top of the condenser attached to an oil bubbler to prevent air from coming into the reaction apparatus. As the AIBN produced radicals to initiate the polymerization process it also produced nitrogen. This displaced the air in the head space of the reactor and kept oxygen (a free radical scavenger) to a minimum.

The oil level was again raised to that of the reaction solution. An eight hour timer was placed on the oil heater's power supply so that after 8 hours of mild reflux, the temperature was dropped to ambient. A thermometer placed in the refluxing reaction solution showed that the reaction temperature was from 84 to 87° C. The polymer so prepared has an average molecular weight of 11,887 atomic mass units with about 120 monomer repeat units and a viscosity of 11 centipoise.

A 10% solution of cured polyurethane in methyl ethyl ketone was prepared by placing 200 grams of polyurethane pellets, sold under the trademark Desmocoll 306 by Bayer Company, into an empty one gallon bottle to which was added 1,800 grams of methyl ethyl ketone. Thereafter, 60 grams of the above-described polymethacrylate adhesion promoter solution, 80 grams of the above-described 10% solution of cured polyurethane, 35 grams of uncured polyurethane (such as sold under the trademark Desmondur N-751 by Bayer Company, and 45 grams of diethylene glycol bis(allylcarbonate) was mixed with 1,380 grams of methyl ethyl ketone to provide 1.6 kilograms of coating solution.

EXAMPLE 2

The procedure of Example 1 was followed except that the amounts of the methacrylate monomers and solvent were changed. In the reaction flask were placed 500 milliliters of methyl ethyl ketone, 84 milliliters of methyl methacrylate, 19.3 milliliters of allyl methacrylate and 3.2 milliliters of 2-hydroxyethyl methacrylate, to provide a terpolymer of 82 mole percent methyl methacrylate, 15 mole percent allyl methacrylate and 3 mole percent of 2-hydroxy ethyl methacrylate. Another difference from Example 1, in keeping with the lower volume amounts of methacrylate monomers, was to add less polymer initiator (1.05 grams of AIBN) to the copolymer solution dissolved in 10 ml methyl ethyl ketone.

EXAMPLE 3

The procedure of Example 1 can be followed except the following additional purification method can be used. This provides a solid material for easier storage, separates out (and removes) unreacted methacrylate monomers for safer operating procedures, and provides a narrower molecular weight distribution of the adhesive polymer.

Infrared spectral analysis of the Example 1 showed unreacted methacrylate monomers (C=C peak at 1639 cm$^{-1}$). A purified polymer without unreacted monomers was precipitated by pouring 200 grams of the crude reaction mixture into 500 ml of heptane and stirring. A ball of polymer formed that was sponge-like in appearance. Excess solution was removed by decanting to leave a white "silly putty"like material containing polymer chains. This material was then dried 10 minutes at 65° C. to leave a dry solid. When needed, this solid can be redissolved in methyl ethyl ketone to form a solution which shows no unreacted monomer peak in the infrared spectrum.

EXAMPLE 4

The procedure of Example 1 or 2 can be followed except that a second alternative purification method can be used to remove unreacted monomers which involves evaporating the methyl ketone solvent from the crude reaction solution. This is done so that the clear polymer that remains is thin enough for residual monomers in the plastic sheet to be baked out. A sheet only a few mm thick would only require several hours at 70° C. to remove 90% of the unreacted monomer. A thicker sheet would require a longer time and/or higher temperature to insure removal of monomer. These monomers would be captured during large scale production to minimize air pollution. When the sheet is free of monomer it will be able to be stored until it is needed and then dissolved in methyl ethyl ketone before use.

EXAMPLE 5

The procedure of Example 2 is followed except that the amounts of methacrylate monomer are different. To the 500 ml of methyl ethyl ketone one can add 75 ml of methyl methacrylate, 18 ml of allyl methacrylate and 11.7 ml of 2-hydroxyethyl methacrylate to yield a terpolymer having 75 mole percent methyl methacrylate, 15 mole percent allyl methacrylate and 10 mole percent 2-hydroxy ethylmethacrylate.

EXAMPLE 6

The procedure of Example 1 or 2 is followed except that in place of the methyl methacrylate, one can use sufficient butyl methacrylate to yield a methacrylate terpolymer having 82 mole percent butylmethacrylate, 15 mole percent allyl methacrylate and 3 mole percent 2-hydroxy ethylmethacrylate.

While there have been shown and described the fundamental novel features of the invention, it will be understood that various omissions, substitutions and changes in the form and details illustrated may be made by those skilled in the art without departing from the spirit of the invention. It is the intention, therefore, to be limited only as indicated by the scope of the following claims.

I claim:

1. An optical lens formed from a glycol bis (allylcarbonate) covalently bonded to a polyvinyl alcohol film by means of an intermediate adhesive layer which comprises (a) a polyurethane and (b) a polymethacrylate terpolymer having pendant allyl and hydroxy groups, wherein said pendant allyl groups are covalently bonded with said glycol bis(allvicarbonate) polymer, said pendant hydroxy groups are covalently bonded with said polyurethane, and said polyurethane is covalently bonded with said polyvinyl alcohol film.

2. The lens of claim 1 in which said glycol bis (allylcarbonate) is diethylene glycol bis(allylcarbonate).

3. The lens of claim 1, in which said polyurethane is uncured polyurethane.

4. The lens of claim 3 in which said intermediate adhesive layer is obtained by mixing said polymethacrylate terpolymer and said uncured polyurethane with cured polyurethane and a plasticizer in a ketone solvent.

5. The lens of claim 1 in which said polymethacrylate terpolymer is formed from the copolymerization of methyl methacrylate, allyl methacrylate and a hydroxyalkyl methacrylate.

6. The lens of claim 5 in which said hydroxyalkyl methacrylate is 2-hydroxyethyl methacrylate.

7. The lens of claim 1 in which said intermediate adhesive layer is applied on each side of said polyvinyl alcohol film at a thickness in the range of about 0.005–5 microns.

8. The lens of claim 7 wherein the thickness of said intermediate adhesive layers is about 0.3 micron.

* * * * *

UNITED STATES PATENT AND TRADEMARK OFFICE
CERTIFICATE OF CORRECTION

PATENT NO. : 6,235,396 B1
DATED : May 22, 2001
INVENTOR(S) : Arthur R. Dixon

It is certified that error appears in the above-identified patent and that said Letters Patent is hereby corrected as shown below:

<u>Title page,</u>
Item [73], add the following Assignee data:

-- Assignee: Younger Mfg. Co. Torrance, California --

Signed and Sealed this

Eighteenth Day of June, 2002

*Attest:*

*Attesting Officer*

JAMES E. ROGAN
*Director of the United States Patent and Trademark Office*